(12) United States Patent
Jordan et al.

(10) Patent No.: US 7,599,377 B2
(45) Date of Patent: *Oct. 6, 2009

(54) SYSTEM AND METHOD FOR TUNNELING STANDARD BUS PROTOCOL MESSAGES THROUGH AN AUTOMOTIVE SWITCH FABRIC NETWORK

(75) Inventors: Patrick D. Jordan, Austin, TX (US); Hai Dong, Austin, TX (US); Walton L. Fehr, Mundelein, IL (US); Hugh W. Johnson, Cedar Park, TX (US); Prakash U. Kartha, Round Rock, TX (US); Samuel M. Levenson, Arlington Heights, IL (US); Donald J. Remboski, Dearborn, MI (US)

(73) Assignee: Temic Automotive of North America, Inc., Deer Park, IL (US)

( * ) Notice: Subject to any disclaimer, the term of this patent is extended or adjusted under 35 U.S.C. 154(b) by 841 days.

This patent is subject to a terminal disclaimer.

(21) Appl. No.: 11/015,606

(22) Filed: Dec. 17, 2004

(65) Prior Publication Data

US 2006/0083250 A1 Apr. 20, 2006

Related U.S. Application Data

(60) Provisional application No. 60/619,232, filed on Oct. 15, 2004.

(51) Int. Cl.
*H04L 12/28* (2006.01)
*H04L 12/56* (2006.01)

(52) U.S. Cl. .................................... 370/400

(58) Field of Classification Search ............ 370/389, 370/242, 217, 216, 241, 328, 225, 230, 234, 370/394, 401, 352, 392, 254, 386, 463, 258, 370/351, 218, 395, 331, 419, 423; 709/220–222, 709/249, 208, 238, 209, 231, 233, 228, 237; 379/114, 90, 93, 88, 900; 710/309; 701/1, 701/36, 210, 115; 340/425, 531; 455/73, 455/41, 512, 452
See application file for complete search history.

(56) References Cited

U.S. PATENT DOCUMENTS 4,816,989 A 3/1989 Finn et al.
(Continued)

OTHER PUBLICATIONS

D. John Oliver, Implementing the J1850 Protocol, 15 pages.
(Continued)

*Primary Examiner*—Hong Cho
*Assistant Examiner*—Prenell P Jones

(57) ABSTRACT

A system and method for tunneling standard bus protocol messages through an automotive switch fabric network. When a bus protocol message arrives on a connecting node in the network, a bus driver in the node will capture the message and store it into a message buffer where the message can be further processed by a tunneling application. Each received bus protocol message will be broken, or combined, to suit the available packet size of the underlying transmit layer of the switch fabric network. Data portions such as message identification, sequence number, port number, bus data type, and data length are reserved in each data packet. If the message is being broken down, the sequence number is used to differentiate the broken segments of the bus protocol message. The bus data type is used to indicate the type of protocol data being transmitted over the switch fabric. The same tunneling application may be used to reassemble the bus protocol message at a receiving node.

28 Claims, 8 Drawing Sheets

U.S. PATENT DOCUMENTS

| | | | |
|---|---|---|---|
| 5,151,899 A * | 9/1992 | Thomas et al. ............. 370/394 |
| 5,195,091 A | 3/1993 | Farwell et al. |
| 5,321,689 A | 6/1994 | Suzuki et al. |
| 5,566,180 A | 10/1996 | Eidson et al. |
| 5,612,953 A | 3/1997 | Olnowich |
| 5,802,052 A | 9/1998 | Venkataraman |
| 6,356,823 B1 | 3/2002 | Iannotti et al. |
| 6,373,834 B1 | 4/2002 | Lundh et al. |
| 6,420,797 B1 | 7/2002 | Steele et al. |
| 6,430,164 B1 | 8/2002 | Jones et al. |
| 6,477,453 B2 | 11/2002 | Oi et al. |
| 6,559,783 B1 | 5/2003 | Stoneking |
| 6,611,519 B1 | 8/2003 | Howe |
| 6,611,537 B1 | 8/2003 | Edens et al. |
| 6,643,465 B1 * | 11/2003 | Bosinger et al. ............ 398/59 |
| 6,732,031 B1 | 5/2004 | Lightner et al. |
| 6,747,365 B2 | 6/2004 | Reinold et al. |
| 6,757,521 B1 | 6/2004 | Ying |
| 6,845,416 B1 * | 1/2005 | Chasmawala et al. ...... 710/107 |
| 7,027,773 B1 | 4/2006 | McMillin |
| 7,210,063 B2 | 4/2007 | Holcroft et al. |
| 7,272,496 B2 * | 9/2007 | Remboski et al. .......... 701/210 |
| 2002/0077739 A1 | 6/2002 | Augsburger et al. |
| 2002/0080829 A1 | 6/2002 | Ofek et al. |
| 2002/0087891 A1 | 7/2002 | Little et al. |
| 2003/0043739 A1 | 3/2003 | Reinold et al. |
| 2003/0043750 A1 | 3/2003 | Remboski et al. |
| 2003/0043779 A1 * | 3/2003 | Remboski et al. .......... 370/351 |
| 2003/0043793 A1 | 3/2003 | Reinold et al. |
| 2003/0043799 A1 | 3/2003 | Reinold et al. |
| 2003/0043824 A1 | 3/2003 | Remboski et al. |
| 2003/0045234 A1 * | 3/2003 | Remboski et al. ............ 455/41 |
| 2003/0045971 A1 | 3/2003 | Reinold et al. |
| 2003/0045972 A1 | 3/2003 | Remboski et al. |
| 2003/0046327 A1 | 3/2003 | Reinold et al. |
| 2003/0051131 A1 | 3/2003 | Reinold et al. |
| 2003/0065630 A1 | 4/2003 | Brown et al. |
| 2003/0091035 A1 | 5/2003 | Roy et al. |
| 2003/0185201 A1 | 10/2003 | Dorgan |
| 2003/0188303 A1 | 10/2003 | Barman et al. |
| 2004/0001593 A1 | 1/2004 | Reinold et al. |
| 2004/0002799 A1 | 1/2004 | Dabbish et al. |
| 2004/0003227 A1 | 1/2004 | Reinold et al. |
| 2004/0003228 A1 | 1/2004 | Fehr et al. |
| 2004/0003229 A1 | 1/2004 | Reinold et al. |
| 2004/0003230 A1 | 1/2004 | Puhl et al. |
| 2004/0003231 A1 | 1/2004 | Levenson et al. |
| 2004/0003232 A1 | 1/2004 | Levenson et al. |
| 2004/0003233 A1 | 1/2004 | Reinold et al. |
| 2004/0003234 A1 | 1/2004 | Reinold et al. |
| 2004/0003237 A1 | 1/2004 | Puhl et al. |
| 2004/0003242 A1 | 1/2004 | Fehr et al. |
| 2004/0003243 A1 | 1/2004 | Fehr et al. |
| 2004/0003245 A1 | 1/2004 | Dabbish et al. |
| 2004/0003249 A1 | 1/2004 | Dabbish et al. |
| 2004/0003252 A1 | 1/2004 | Dabbish et al. |
| 2004/0042469 A1 * | 3/2004 | Clark et al. ................. 370/401 |
| 2004/0043739 A1 | 3/2004 | Jordanger et al. |
| 2004/0043750 A1 | 3/2004 | Kim |
| 2004/0043824 A1 | 3/2004 | Uzelac |
| 2004/0045234 A1 | 3/2004 | Morgan et al. |
| 2004/0045971 A1 | 3/2004 | Lothe |
| 2004/0131014 A1 | 7/2004 | Thompson, III et al. |
| 2004/0148460 A1 * | 7/2004 | Steinmetz et al. ........... 711/114 |
| 2004/0213295 A1 | 10/2004 | Fehr |
| 2004/0227402 A1 | 11/2004 | Fehr et al. |
| 2004/0254700 A1 | 12/2004 | Fehr et al. |
| 2004/0258001 A1 | 12/2004 | Remboski et al. |
| 2005/0004727 A1 | 1/2005 | Remboski et al. |
| 2005/0038583 A1 | 2/2005 | Fehr et al. |
| 2005/0160285 A1 | 7/2005 | Evans |
| 2005/0251604 A1 | 11/2005 | Gerig |
| 2005/0251608 A1 | 11/2005 | Fehr et al. |
| 2006/0013263 A1 | 1/2006 | Fellman |
| 2006/0013565 A1 | 1/2006 | Baumgartner |
| 2006/0020717 A1 | 1/2006 | Remboski et al. |
| 2006/0083172 A1 * | 4/2006 | Jordan et al. ................ 370/241 |
| 2006/0083173 A1 * | 4/2006 | Jordan et al. ................ 370/242 |
| 2006/0083229 A1 | 4/2006 | Jordan et al. |
| 2006/0083250 A1 * | 4/2006 | Jordan et al. ................ 370/400 |
| 2006/0083264 A1 | 4/2006 | Jordan et al. |
| 2006/0083265 A1 | 4/2006 | Jordan et al. |
| 2006/0282549 A1 * | 12/2006 | Vinnemann .................... 710/3 |

OTHER PUBLICATIONS

Controller Area Network (CAN)—Protocol, CAN in Automation (CIA), 5 pages, 2003.

D. John Oliver, Intel Corporation, "Implementing the J1850 Protocol", 15 pages, available from the Internet at http://developer.intel.com/design/intarch/papers/j1850_wp.pdf (per Internet Archive Wayback Machine) Sep. 2000.

"Controller Area Network (CAN)—Protocol", copyright 2003 by CAN in Automation (CiA), 5 pages, available from the Internet at http://www.can-cia.org/can/protocol/ (per Internet Archive Wayback Machine) May 2004.

* cited by examiner

| 284a → | Message ID = 01 | SEQ = 1 | Port # | TP | Arb 1 | Arb 2 | Arb 3 | Arb 4 | Data 1 | Data 2 |
| 284b → | Message ID = 01 | SEQ = 2 | Data Length | Data 3 | Data 4 | Data 5 | Data 6 | Data 7 | Data 8 |

FIG. 8

| 294a → | Message ID = 01 | SEQ = 1 | Port # | TP | Header | Data 1 | Data 2 | Data 3 | Data 4 | Data 5 |
| 294b → | Message ID = 01 | SEQ = 2 | Data Length | Data 6 | Data 7 | Data 8 | Unused | Unused | Unused |

FIG. 9

SYSTEM AND METHOD FOR TUNNELING STANDARD BUS PROTOCOL MESSAGES THROUGH AN AUTOMOTIVE SWITCH FABRIC NETWORK

The present application claims priority from provisional application Serial No. 60/619,232, entitled "System and Method for Tunneling Standard Bus Protocol Messages Through an Automotive Switch Fabric Network," filed Oct. 15, 2004, which is commonly owned and incorporated herein by reference in its entirety.

FIELD OF THE INVENTION

This invention in general relates to in-vehicle communication networks and particularly to a system and method for tunneling standard bus protocol messages through an automotive switch fabric network.

BACKGROUND OF THE INVENTION

The commonly assigned U.S. patent application entitled "Vehicle Active Network," Ser. No. 09/945,581, filed Aug. 31, 2001, Publication Number US 20030043793, the disclosure of which is hereby expressly incorporated herein by reference, introduces the concept of an active network that includes a switch fabric. The switch fabric is a web of interconnected switching devices or nodes. The switching device or nodes are joined by communication links for the transmission of data packets between the switching devices or nodes. Control devices, sensors, actuators and the like are coupled to the switch fabric, and the switch fabric facilitates communication between these coupled devices.

The coupled devices may be indicator lights, vehicle control systems, vehicle safety systems, and comfort and convenience systems. A command to actuate a device or devices may be generated by a control element coupled to the switch fabric and is communicated to the device or devices via the switch fabric nodes.

In the context of vehicular switch fabric networks, a challenge is presented in terms of connecting the switch fabric network to standard or legacy bus architectures such as the Controller Area Network (CAN) protocol, the SAE J1850 Communications Standard, the Local Interconnect Network (LIN) protocol, the FLEXRAY Communications System Standard, the Media Oriented Systems Transport or MOST Protocol, or similar bus structures. A need exists for switch fabric networks to operate seamlessly with the standard bus architectures and for switch fabric networks to handle message protocols associated with these standard bus architectures.

It is, therefore, desirable to provide a system and method to overcome or minimize most, if not all, of the preceding problems especially in the area of tunneling standard bus protocols across the nodes in an automotive switch fabric network.

BRIEF DESCRIPTION OF THE DRAWINGS

FIG. 8 illustrates a set of payload portions of data packets that carry information contained in the message of FIG. 5;

FIG. 9 illustrates a set of payload portions of data packets that carry information contained in the message of FIG. 6;

Figure 1:
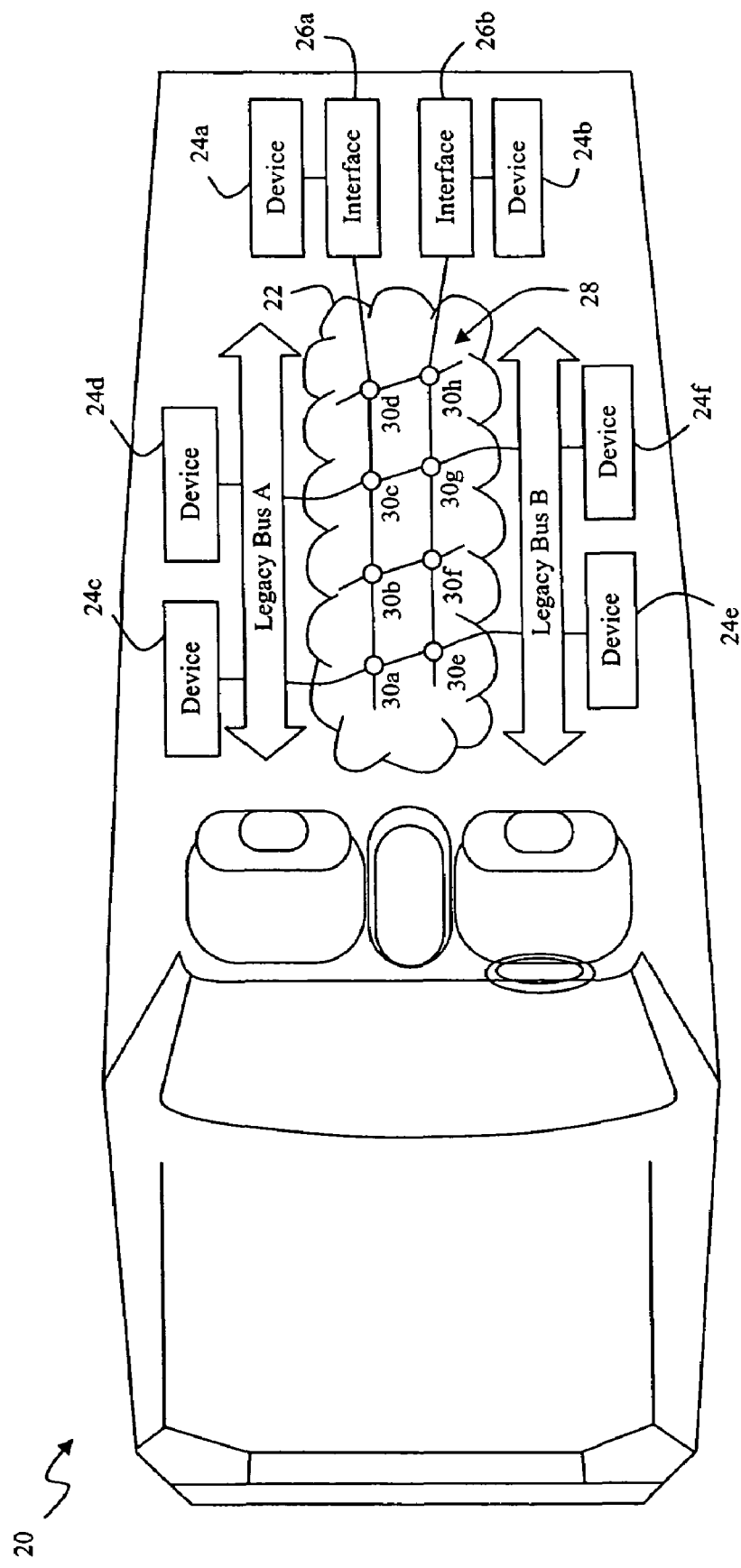
FIG. 1 is a block diagram illustrating an embodiment of a vehicle switch fabric network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for tunneling standard bus protocol messages through an automotive switch fabric network. In sum, when a bus protocol message arrives on a connecting node in the network, a bus driver in the node will capture the message and store it into a message buffer where the message can be further processed by a tunneling application. The tunneling application periodically checks if there are any new bus protocol messages coming from a port connected to the bus. Each received bus protocol message will be broken, or combined, to suit the available packet size of the underlying transmit layer of the switch fabric network. Data portions such as message identification, sequence number, port number, bus data type, and data length are reserved in each data packet. If the message is being broken down, the sequence number is used to differentiate the broken segments of the bus protocol message. The bus data type is used to indicate the type of protocol data being transmitted over the switch fabric. The same tunneling application may be used to reassemble the bus protocol message at a receiving node.

Now, turning to the drawings, FIG. 1 illustrates a vehicle 20 including a network 22 to which various vehicle devices 24a-f are coupled directly via interfaces 26a-b and coupled indirectly via legacy buses A, B. The vehicle devices 24a-f may be sensors, actuators, and processors used in connection with various vehicle functional systems and sub-systems, such as, but not limited to, diagnostic, control-by-wire applications for throttle, braking and steering control, adaptive suspension, power accessory control, communications, entertainment, and the like. The vehicle devices 24a-f is particularly adapted to provide one or more functions associated with the vehicle 20. These vehicle devices 24a-f may be data producing, such as a sensor, data consuming, such as an actuator, or processing, which both produces and consumes data.

The interfaces 26a-b are any suitable interface for coupling the particular vehicle device 24a-b to the network 22, and may be wire, optical, wireless or combinations thereof. The standard buses A and B may include one or more legacy communication media, i.e., legacy bus architectures such as the Controller Area Network (CAN) protocol, the SAE J1850 Communications Standard, the Local Interconnect Network (LIN) protocol, the FLEXRAY Communications System Standard, the Media Oriented Systems Transport or MOST Protocol, or similar bus structures. In this embodiment, the standard buses A and B are configured to permit communication between the network 22 and devices 24c-f.

The network 22 may include a switch fabric 28 defining a plurality of communication paths between the vehicle devices 24a-f. The communication paths permit multiple simultaneous peer-to-peer, one-to-many, many-to-many, etc. communications between the vehicle devices 24a-f. During operation of the vehicle 20, data exchanged, for example, between devices 24a and 24b may utilize any available path or paths between the vehicle devices 24a, 24b. In operation, a single path through the switch fabric 28 may carry all of a single data communication between one vehicle device 24a and another vehicle device 24b, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path. Moreover, communications between other of the devices 24c, 24f may occur simultaneously using the communication paths within the switch fabric 28.

Figure 2:
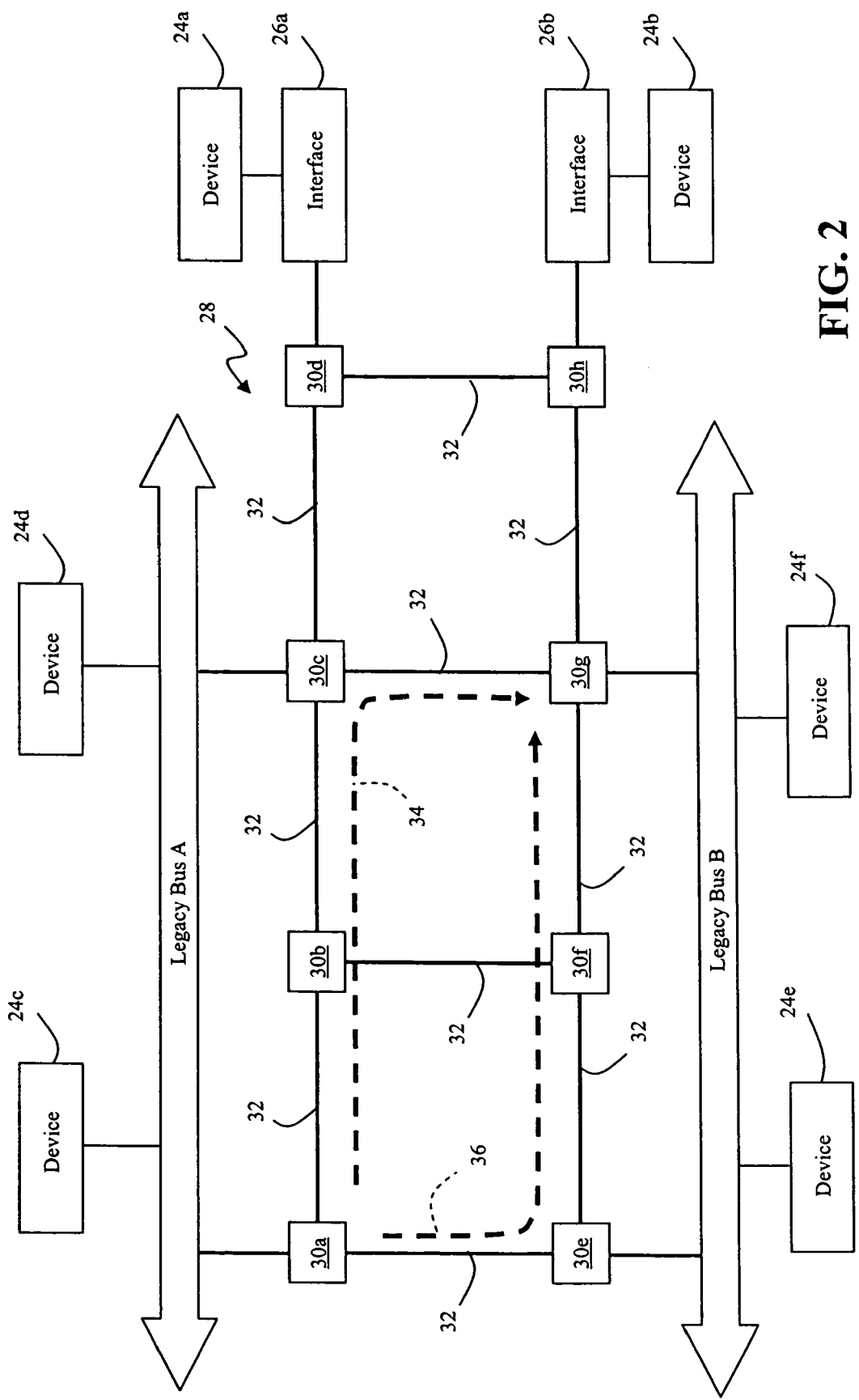
FIG. 2 is a diagram illustrating a portion of the switch fabric network connected to a plurality of devices through standard protocol buses and direct interfaces.

Referring to FIG. 2, for purposes of illustration, an active network 22 in accordance with one embodiment includes a switch fabric 28 of nodes 30a-h that communicatively couples a plurality of devices 24a-f via legacy buses A, B and interfaces 26a-b. Connection links or media 32 interconnects the nodes 30a-h. The connection media 32 may be bounded media, such as wire or optical fiber, unbounded media, such as free optical or radio frequency, or combinations thereof. In addition, the term node is used broadly in connection with the definition of the switch fabric 28 to include any number of intelligent structures for communicating data packets within the network 22 without an arbiter or other network controller and may include: switches, intelligent switches, routers, bridges, gateways and the like. Data is carried through the network 22 in data packet form guided by the nodes 30a-h.

The cooperation of the nodes 30a-h and the connection media 32 define a plurality of communication paths between the devices 24a-f that are communicatively coupled to the network 22. For example, a route 34 defines a communication path from a first node 30a to a second node 30g. If there is a disruption along the route 34 inhibiting communication of the data packets from the first node 30a to the second node 30g, for example, if one or more nodes are at capacity or have become disabled or there is a disruption in the connection media joining the nodes along route 34, a new route, illustrated as route 36, can be used. The route 36 may be dynamically generated or previously defined as a possible communication path, to ensure the communication between the first node 30a and the second node 30g.

The network 22 may comply with transmission control protocol/Internet (TCP/IP), asynchronous transfer mode (ATM), Infiniband, RapidIO, or other packet data protocols. As such, the network 22 utilizes data packets, having fixed or variable length, defined by the applicable protocol. For example, if the network 22 uses asynchronous transfer mode (ATM) communication protocol, ATM standard data cells are used.

Figure 3:
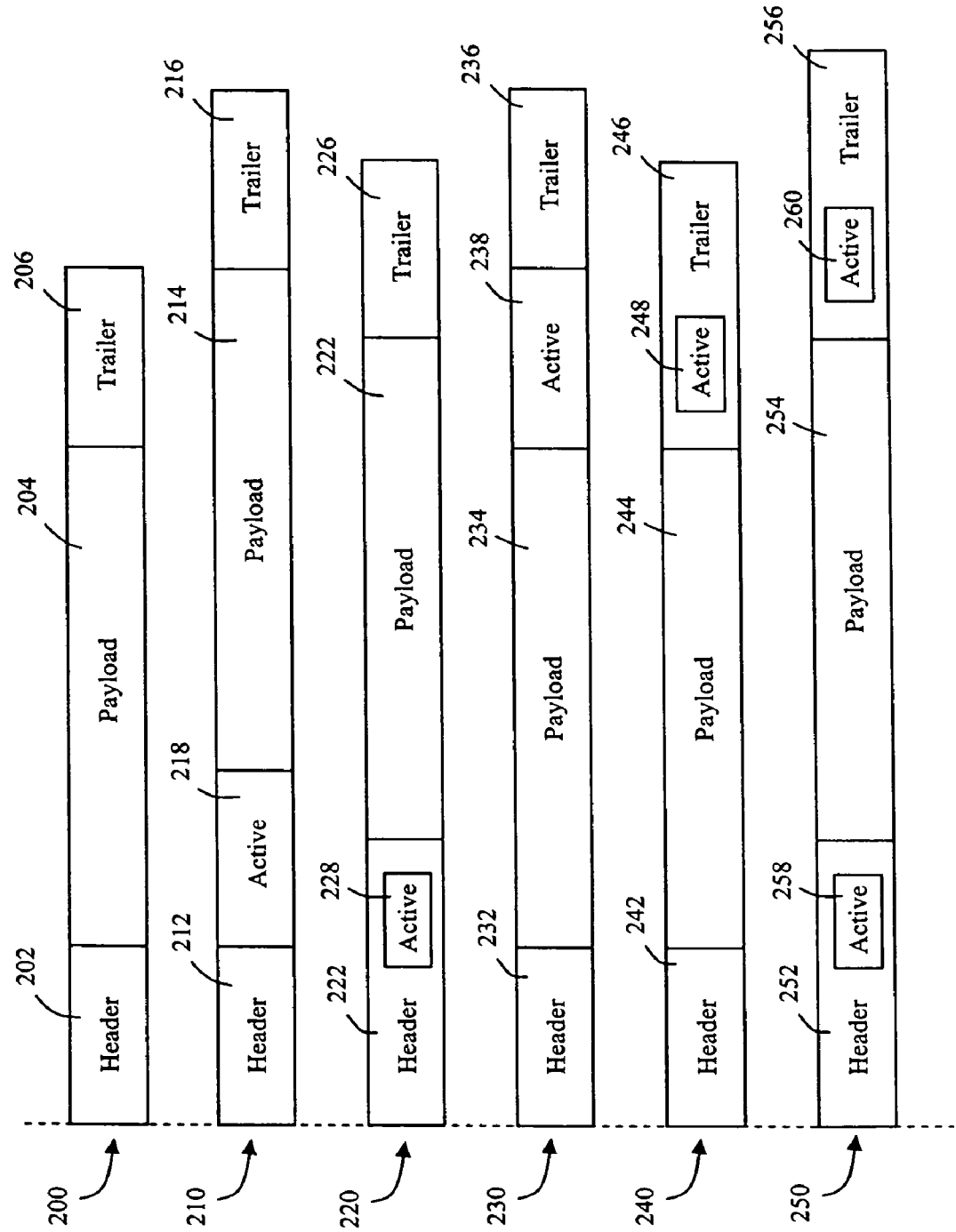
FIG. 3 illustrates various data packets that may be adapted for use in a vehicle switch fabric network.

FIG. 3 illustrates several data packet configurations that may be used in connection with switch fabric networks according to the embodiments of the present invention. As described, the network 22 may be configured to operate in accordance with TCP/IP, ATM, RapidIO, Infiniband and other suitable communication protocols. These data packets include structure to conform to the standard required. In one embodiment, a data packet for this invention may include a data packet 200 having a header portion 202, a payload portion 204, and a trailer portion 206. As described herein, the network 22 and the nodes 30a-h forming the switch fabric 28 may contain processing capability. In that regard, a data packet 210 includes along with a header portion 212, payload portion 214, and trailer portion 216 an active portion 218. The active portion 218 may cause the network element to take some specific action, for example providing alternative routing of the data packet, reconfiguration of the data packet, reconfiguration of the node, or other action, based upon the content of the active portion 218. The data packet 220 includes an active portion 228 integrated with the header portion 222 along with a payload portion 224 and a trailer portion 226. The data packet 230 includes a header portion 232, a payload portion 234 and a trailer portion 236. An active portion 238 is also provided, disposed between the payload portion 234 and the trailer portion 236. Alternatively, as shown by the data packet 240, an active portion 248 may be integrated with the trailer portion 246 along with a payload portion 244 and a header portion 242. The data packet 250 illustrates a first active portion 258 and a second active portion 260, wherein the first active portion 258 is integrated a header portion 252 and the second active portion 258 is integrated with the trailer portion 256. The data packet 250 also includes a payload portion 254. Other arrangements of the data packets for use with the present invention may be envisioned.

The active portion of the data packet may represent a packet state. For example, the active portion may reflect a priority of the data packet based on aging time. That is, a packet initially generated may have a normal state, but for various reasons, is not promptly delivered. As the packet ages as it is routed through the active network, the active portion can monitor time since the data packet was generated or time when the packet is required, and change the priority of the data packet accordingly. The packet state may also represent an error state, either of the data packet or of one or more nodes of the network 22. The active portion may also be used to messenger data unrelated to the payload within the network 22, track the communication path taken by the data packet through the network 22, provide configuration information (route, timing, etc.) to nodes 30a-h of the network 22, provide functional data to one or more devices 24a-d coupled to the network 22 or provide receipt acknowledgement.

The payload portion of the data packets carries data and other information relating to the message being transmitted through the network 22. The size of the data packet (including the payload portion) will be constrained by the physical layer on which the switch fabric 28 is built. There are situations where the message size at the application layer will be larger than the packet size allowed to be transmitted over the network 22. One situation, as described in more detail below, is where standard bus protocol messages need to be transmitted through the switch fabric 28. Accordingly, in one embodiment of the present invention, a message in the application layer that is larger than the packet size of the network 22 will be broken into smaller units to fit the packet size limitation. Each unit is placed into an individual data packet and transmitted independently over the switch fabric 28 to a destination node. At the destination node, the individual data packets are reassembled to its original form and passed to the application that receives and processes the message.

Figure 4:
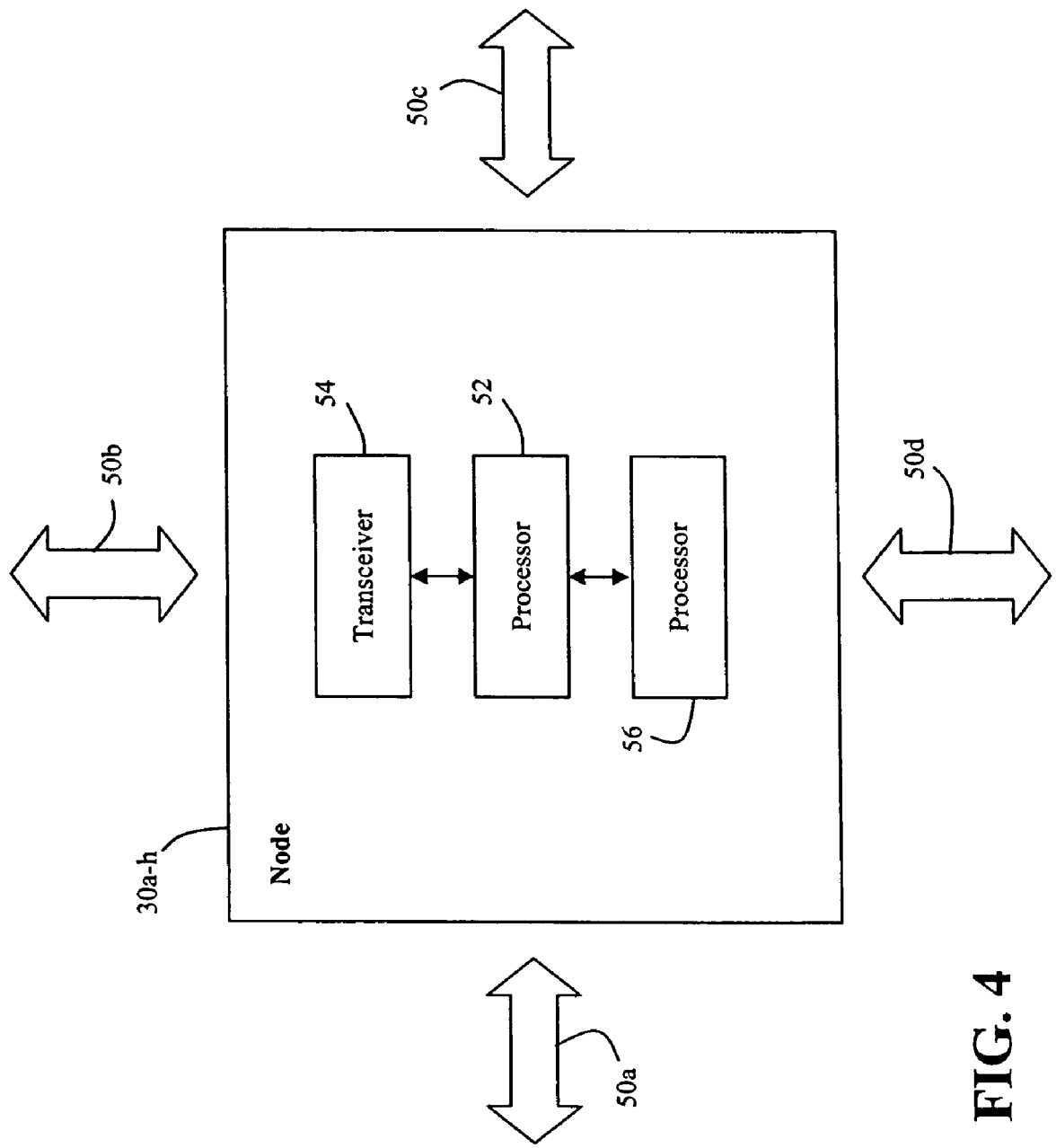
FIG. 4 illustrates one embodiment of components in a node of the switch fabric network.

Referring to FIG. 4, to illustrate the functionality and the adaptability of a node 30a-h in the switch fabric 28, in one embodiment, a node 30a-h may have a plurality of input/output ports 50a-d although separate input and output ports could also be used. Various configurations of the node 30a-h having more or fewer ports may be used in the network 22 depending on the application. The nodes 30a-h may include a processor 52, at least one transceiver 54, and a memory 56. The processor 52 is configured to execute instructions from software components residing in the memory 56. Although the processor 52 and memory 56 are shown to be integrated with the node, in other applications, the process 52 and memory 56 may be located at other places in the switch fabric 28. The memory 56 contains a set of software components to operate the nodes 30a-h for normal data communications and operation within the switch fabric 28.

For nodes 30a, 30c, 30e, 30g that are connected to a legacy bus A, B, the node may further have a bus driver, a tunneling application, and a message buffer to store and transmit messages through the switch fabric 28. For instance, when a bus protocol message arrives on a connecting node 30a, 30c, 30e, 30g, the bus driver will capture the message and store it into the message buffer where the message can be further processed by the tunneling application. The features of the tunneling application are described in more detail below. The tunneling application periodically checks if there are any new bus protocol messages coming from the port connected to the legacy bus A, B. As will be explained further below, in one embodiment, each received bus protocol message will be broken, or combined, to suit the available packet size of the underlying transmit layer of the switch fabric network 28. Data portions such as message identification, sequence number, port number, bus data type, and data length are reserved in each data packet. If the message is being broken down, the sequence number is used to differentiate the broken segments of the legacy bus protocol message. The bus data type is used to indicate the type of bus data being transmitted over the switch fabric 28. The same tunneling application may be used to reassemble the bus protocol message at a receiving node.

To explain these features further, the embodiment of FIGS. 1 and 2 includes applications where the switch fabric 28 is connected to devices 24c-f through one or more standard or legacy buses A, B. For ease of transition from traditional bus architecture to the switch fabric architecture described above, it is important for the switch fabric 28 to be able to operate seamlessly with current bus protocols. For purposes of illustrating the present invention, assume that the legacy bus A operates in accordance to the Controller Area Network (CAN) protocol and that the legacy bus B operates in accordance to the SAE J1850 Communications Standard. One of ordinary skill in the art having the benefit of this disclosure will realize that other legacy buses may be used including the Local Interconnect Network (LIN) protocol, the FLEXRAY Communications System Standard, the Media Oriented Systems Transport or MOST Protocol, or similar bus structures. The CAN protocol and the SAE J1850 Communications Standard will be used for illustration purposes.

Figure 5:
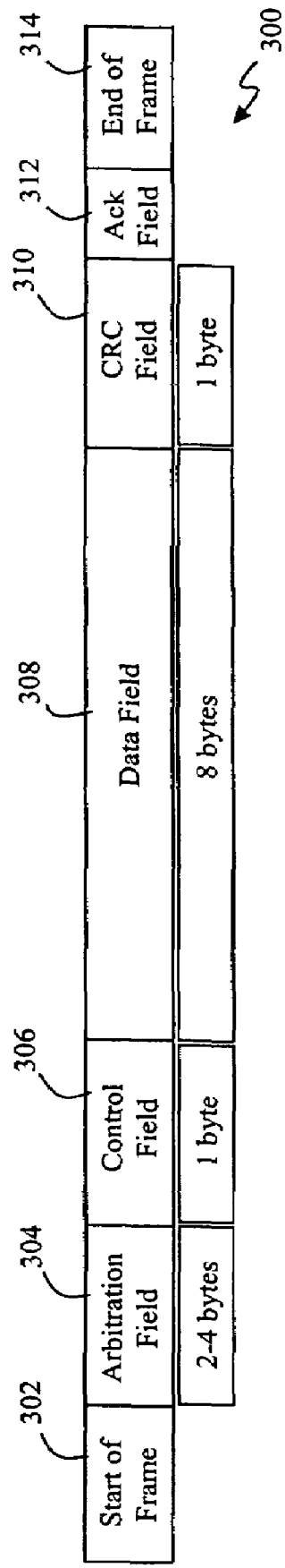
FIG. 5 illustrates a format for a Controller Area Network (CAN) frame message.

The CAN protocol is an international standard that is based on a message oriented transmission protocol. The CAN protocol supports two message frame formats, a CAN base frame and a CAN extended frame, as will be described further below. Referring to FIG. 5, a CAN frame message 300 begins with a start of frame portion 302, containing a start bit, and ends with an end of frame portion 314. Between the start of frame portion 302 and the end of frame portion 314, the main fields of a typical CAN frame message 300 includes an arbitration field 304, a control field 306, a data field 308, a cyclic redundant check (CRC) field 310, and an acknowledge field 312. The arbitration field 304 consists of an identifier and a remote transmission request bit. The length of the identifier (and the size of the arbitration field) will vary depending on whether the CAN frame message is a CAN base frame or a CAN extended frame. The CAN base frame supports a length of 11 bits for the identifier and the CAN extended frame supports a length of 29 bits for the identifier. The remote transmission request bit is used to distinguish between a data frame and a data request frame called a remote frame.

The control field 306 of the CAN frame message 300 contains an identifier extension bit that distinguishes between the CAN base frame and the CAN extended frame. The control field 306 of a CAN frame message 300 also contains a Data Length Code (DLC) that is used to indicate the number of following data bytes in the data field. If the message is used as a remote frame, the DLC contains the number of requested data bytes.

The data field 308 of the CAN frame message 300 is configured to hold up to 8 data bytes. After the data field 308, the CAN frame message 300 has a CRC field 310 that contains a cyclic redundant check sum. The cyclic redundant check sum allows for errors to be checked for the incoming CAN frame message 300. The acknowledge field 312 includes an acknowledge slot and an acknowledge delimiter. The acknowledge field 312 is used by a receiving device to acknowledge whether data is received correctly.

Figure 6:
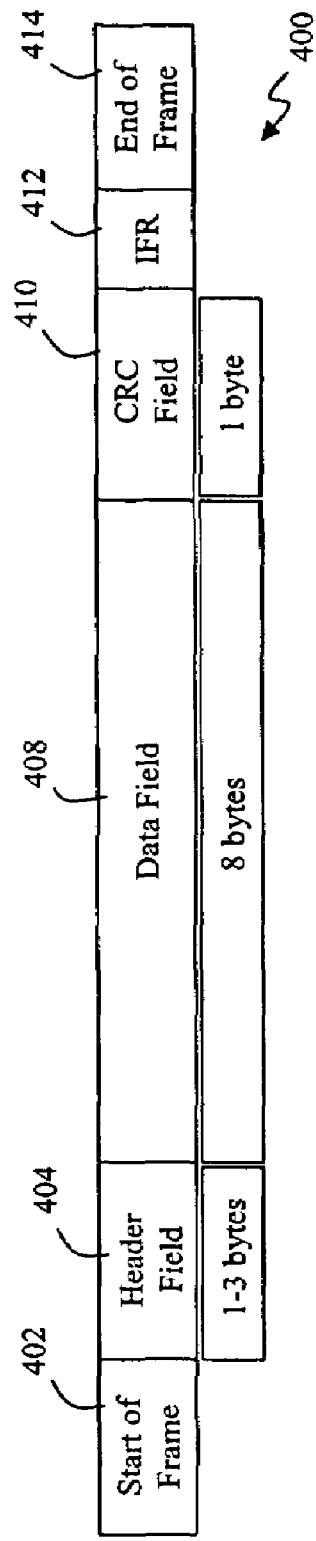
FIG. 6 illustrates a format for a SAE J1850 Communications Standard message.
Figure 7:
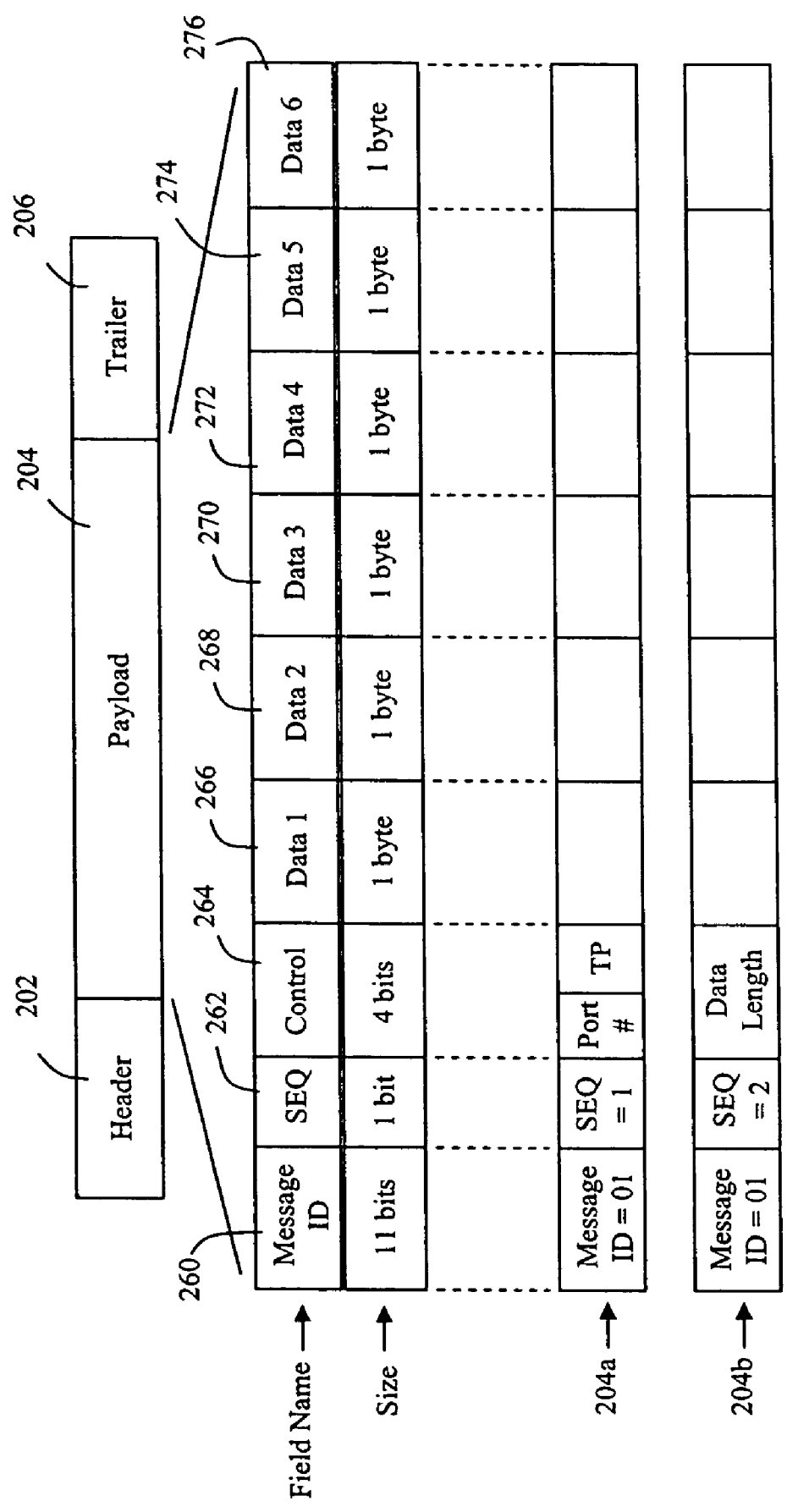
FIG. 7 illustrates a set of payload portions of data packets that carry information contained in legacy bus protocol messages.

The SAE J1850 Communications Standard is an international standard that is also based on a message oriented transmission protocol. The J1850 protocol supports two systems, a 41.6 kb/s Pulse Width Modulation (PWM) scheme and a 10.4 kb/s Variable Pulse Width (VPW) scheme. The VPW will be discussed for purposes of illustrating a message under the J1850 protocol. Referring to FIG. 6, a J1850 frame message 400 operating under the VPW scheme begins and ends with pre-defined periods called a start of frame portion 402 and an end of frame portion 414. Between the start of frame portion 402 and the end of frame portion 414, the main fields of a typical J1850 message includes a header field 404, a data field 408, a cyclic redundant check (CRC) field 410, and an in-frame response 412. The header field 304 may be one to three bytes and include bits for information such as message priority, size of header, whether an in-frame response is requested, addressing mode, and message type.

The data field 408 of the J1850 message 400 is configured to hold up to 8 data bytes. After the data field 408, the J1850 message 400 has a CRC field 410 that contains a cyclic redundant check sum. The cyclic redundant check sum allows for errors to be checked for the incoming J1850 message 400.

The in-frame response 412 provides a mechanism for devices that receive SAE J1850 frame messages to acknowledge receipt. A bit in the header field 304, mentioned above as an in-frame response bit, triggers the device receiving the frame message to append a reply to the end of the transmitting devices original frame message. This provides for efficient communications in that device receiving the message may respond within the same message frame as the original frame message.

The present invention allows the nodes 30a-h to be connected to different types of legacy bus protocols and tunnel the legacy bus protocol message through the switch fabric 28. The present invention advantageously allows for a modular concept and permits nodes 30a-h to be connected to a variety of bus architectures. In one embodiment of the present invention, legacy bus protocol messages (such as the CAN frame message 300 and the J1850 message 400) are tunneled through the switch fabric 28 protocol by dividing the messages into two or more separate units or data packets for transmission over the switch fabric 28. As described in FIG. 3, the switch fabric 28 protocol may transmit a variety of data packets having specific header portions, payload portions, and trailer portion.

For purposes of illustrating the present invention, assume that the switch fabric 28 of FIGS. 1 and 2 use data packets such as the data packet 200 shown in FIG. 3 having a header portion 202, a payload portion 204, and a trailer portion 206. This data packet 200 does not include an active portion although an active portion may also be included (such as those shown in FIG. 3 as data packets 210, 220, 230, 240, 250). Also assume that in one embodiment that the payload portion 204 of switch fabric 28 is limited to 8 bytes.

In this embodiment, as shown in FIG. 6, a legacy bus protocol message (such as the CAN frame message 300 and the J1850 message 400) may be divided into at least two separate data packet messages having a first payload portion 204a and a second payload portion 204b. In particular, in one embodiment, the payload portion 204 of the data packets 200 may be divided into a message identification portion 260, a sequence number portion 262, a control portion 264, and a plurality of data elements 266-276. Although the exact fields and the division of the number of bytes and bits may vary, in one example, the message identification portion 260 may include 11 bits, the sequence number portion 262 may include 1 bit, the control portion 264 may include 4 bits, and the data elements 266-276 may be each 1 byte.

The message identification portion 260 for each of the payload portions 204a, 204b will contain a unique message identification assigned to the particular legacy bus message (for example, the CAN frame message 300 or the J1850 message 400). The message identification within the portion 260 will be the same for all payload portions 204a, 204b that are common to the same legacy bus message. The message identification is used by the nodes 30a-h to track the received data packets so that it can associated different payload portions 204a, 204b with the same legacy bus message.

The sequence portion 262 contains a sequence number associated with the payload portions 204a, 204b. The bit(s) for the sequence number portion 262 in each payload portions 204a, 204b will be different. The bits in the sequence number portions 262 are be used by the nodes 30a-h (in conjunction with the message identification) to group the received data packets so that it can re-assemble the legacy message in the correct order.

The control portion 264 contains information that identifies information pertaining to the particular legacy bus protocols and any other information that may help the data packet to route the data packet 200 to the correct destination node. For instance, the control portion 264 of the first payload portion 204a may include an identification of the tunneling protocol (TP) such as whether the received bus message relates to the Controller Area Network (CAN) protocol, the SAE J1850 Communications Standard, the Local Interconnect Network (LIN) protocol, the FLEXRAY Communications System Standard or similar bus structures. The control portion 264 of the first payload portion 204a may also include a port number (Port #) to help route the data packets 200 to the correct destination. As mentioned above in FIG. 4, the nodes 30a-h have a plurality of the input/output ports 50a-d that interconnect one node to other nodes. The control portion 264 of the second payload portion 204a may also include information regarding the length of data in the data field of the legacy bus protocol message. For example, the CAN bus protocol includes a Data Length Code (DLC) that can be used to indicate the number of data bytes in the data field.

The plurality of data elements 266-276 in the first payload portion 204a will contain any remaining portions specific to the legacy bus protocols as well as the data elements in the data fields 308, 408 of the legacy bus messages 300, 400. For instance, as shown in FIG. 8, for the CAN frame message 300, some of the data elements 266-272 in a first payload portion 284a may contain the bytes in the arbitration field 304 of the CAN frame message 300. The other data elements 274-276 may contain a first portion of the data elements in the data field 308 of the CAN frame message 300. The data elements 266-276 in a second payload portion 284b may contain a second portion of the data elements in the data field 308 of the CAN frame message 300.

On the other hand, as shown in FIG. 9, for the J1850 message 400, some of the data elements 266 in a first payload portion 294a may contain the byte(s) in the header field 404 of the J1850 message 400. The other data elements 268-276 may contain a first portion of the data elements in the data field 408 of the J1850 message 400. The data elements 266-276 in a second payload portion 294b may contain a second portion of the data elements in the data field 408 of the J1850 message 400.

Figure 10:
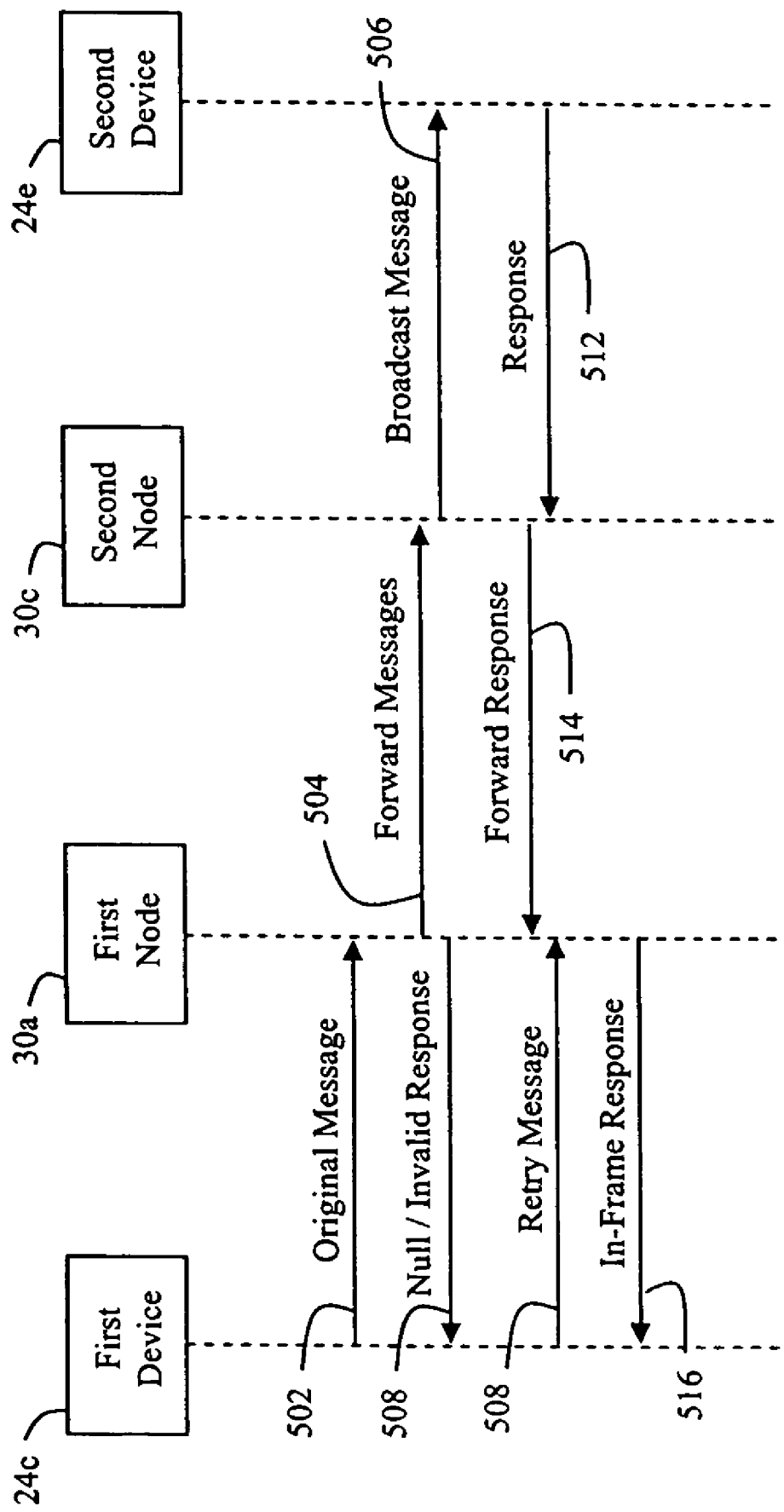
FIG. 10 illustrates a series of communications between a first node and a second node over the switch fabric network.

In a further embodiment, the present invention includes a mechanism for handling acknowledgments used in some legacy buses such the in-frame responses used in the J1850 frame message described above. Referring to FIG. 10, assume that a message needs to be transmitted from a first device 24c and tunneled through the switch fabric 28 (nodes 30a, 30c) to a second device 24e. As mentioned above, if the in-frame response bit is set in the header field 304 of the J1850 frame message 300, the transmitting device 24c will expect an in-frame response from the receiving device (here, node 24e).

In one embodiment, the first device 24c will broadcast an original J1850 frame message over the data bus A that interconnects the first device 24c and the first node 30a (arrow 502). The J1850 frame message may have a format similar to the frame message 400 described in FIG. 6. The first node 30a will receive the frame message 400 and recognize that it needs to be tunneled through the switch fabric 28. As explained above, the first node 30a may divide the message into two or more data packets that includes payload portions 294a, 294b (example payload portions are shown in FIG. 9). The divided messages may then be forwarded through the switch fabric 28 to the second node 30c (arrow 504). The second node 30c will receive the messages and reassemble payload portions 294a, 294b back into the original J1850 frame message 400 transmitted by the first device 24c. The second node 30c may then broadcast the message over the data bus B that interconnects the second node 30c to the second device 24e (arrow 510), assuming in this embodiment that the data bus B also operates in accordance to the SAE J1850 Communications Standard.

An issue that may arise during the above-described tunneling operation is that the first device 24c may have set a bit in the header field 304, mentioned above as an in-frame response bit, that requires the second device 24e to reply with a response. The first node 30a may not know the correct in-frame response at the time the original frame message 400 is seen at the first node 30a. The present invention solves this issue by including an application in the first device 24c that includes a retry strategy. Additionally, the method includes configuring the first node 30a, upon receipt of the original message 300, to reply with a null or invalid response (arrow 508). The first device 24c will see the null or invalid response and initiate the retry strategy. Meanwhile, after the second device 24e receives the reassembled frame message 300, it will insert the correct in-frame response over the bus interconnecting the second device 24e to the second node 30c (arrow 512). The second node 30c will then tunnel the in-frame response via data packets to the first node 30a (arrow 514). The retry strategy includes a process that allows the first device 24c to broadcast a retry message, after a predetermined period, to the first node 30a (arrow 508). This will allow the first node 30a to then insert the correct in-frame response when it receives the retry message (arrow 516).

What has been described is a system and method for tunneling legacy bus protocols or other bus architecture data through an automotive switch fabric network. This is particular useful in transitioning traditional bus architectures to an automotive switch fabric network. In sum, when a bus protocol message arrives on a connecting node in the network, a bus driver in the node will capture the message and store it into a message buffer where the message can be further processed by a tunneling application. The tunneling application periodically checks if there are any new bus protocol messages coming from the port connected to the bus. Each received bus protocol message will be broken or combined to suit the available packet size of the underlying transmit layer of the switch fabric network. Data portions such as message identification, sequence number, port number, bus data type, and data length are reserved in each data packet. If the message is being broken down, the sequence number is used to differentiate the broken segments of the bus protocol message. The bus data type is used to indicate the type of bus data being transmitted over the switch fabric. The same tunneling application may be used to reassemble the bus protocol message at a receiving node. The above description of the present invention is intended to be exemplary only and is not intended to limit the scope of any patent issuing from this application. The present invention is intended to be limited only by the scope and spirit of the following claims.

What is claimed is:

1. A method for sending a bus protocol message through a switch fabric of a vehicle communication network, the switch fabric including a plurality of nodes joined by communication links for the transmission of data packets therebetween, the bus protocol message having at least message data, the method comprising the steps of:
   receiving the bus protocol message from a standard protocol bus at a node in the switch fabric, the bus protocol message requiring a response to occur during a predetermined time;
   generating a retry response on the standard protocol bus to permit the response to occur at a later time;
   generating a first data packet comprising a first message identification, a first sequence number, and a plurality of first data elements, the plurality of first data elements containing at least a first portion of the message data in the bus protocol message;
   generating a second data packet comprising a second message identification, a second sequence number, and a plurality of second data elements, the plurality of second data elements containing at least a second portion of the message data in the bus protocol message;
   transmitting the first data packet and the second data packet to a target node in the switch fabric of the vehicle communication network;
   receiving the first data packet and the second data packet at the target node of the vehicle communication network;
   assembling at least the first portion of the message data and the second portion of the message data based on the first and second message identifications and the first and second sequence numbers.

2. The method in claim 1, wherein the standard protocol bus operates in accordance with at least one of a Controller Area Network (CAN) protocol, a SAE J1850 Communications Standard, a Local Interconnect Network (LIN) protocol, a FLEXRAY Communications System Standard, and a Media Oriented Systems Transport (MOST) Protocol.

3. The method in claim 1, wherein the standard protocol bus operates in accordance with a Controller Area Network (CAN) protocol and the plurality of first data elements of the first data packet further contains data of an arbitration field of the bus protocol message.

4. The method in claim 1, wherein the standard protocol bus operates in accordance with a SAE J1850 Communications Standard and the plurality of first data elements of the first data packet further contains data of a header field of the bus protocol message.

5. The method in claim 1, wherein the first or second data packet further comprises a control field that includes an identification of a type of standard protocol bus.

6. The method in claim 1, wherein the first or second data packet further comprises a control field that includes an identification of a length of the message data of the bus protocol message.

7. The method in claim 1, wherein the first data packet comprising a header portion, a payload portion, and a trailer portion, the payload portion containing the first message identification, the first sequence number, and the plurality of first data elements.

8. A method for sending a bus protocol message through a switch fabric of a vehicle communication network, the switch fabric including a plurality of nodes joined by communication links for the transmission of data packets therebetween, the bus protocol message having at least message data, the method comprising the steps of:
   receiving the bus protocol message from a standard protocol bus at a node in the switch fabric, the bus protocol message requiring a response to occur during a predetermined time;
   generating a retry response on the standard protocol bus to permit the response to occur at a later time;
   dividing the message data of the bus protocol message into a first data packet and a second data packet, the first data packet and the second data packet comprising:
   a message identification associated with the bus protocol message and a sequence number;
   a sequence number associated with an order of the divided message data;
   and a plurality of data elements, the plurality of data elements for the first data packet including at least a first portion of the message data, the plurality of the data elements for the second data packet including at least a second portion of the message data;
   transmitting the first and second data packets to a target node in the switch fabric of the vehicle communication network;
   assembling at least the first portion of the message data and the second portion of the message data based on the message identification associated with the bus protocol message and the sequence numbers.

9. The method in claim 8, wherein the standard protocol bus operates in accordance with at least one of a Controller Area Network (CAN) protocol, a SAE J1850 Communications Standard, a Local Interconnect Network (LIN) protocol, a FLEXRAY Communications System Standard, and a Media Oriented Systems Transport (MOST) Protocol.

10. The method in claim 8, wherein the standard protocol bus operates in accordance with a Controller Area Network (CAN) protocol and the plurality of first data elements of the first data packet further contains data of an arbitration field of the bus protocol message.

11. The method in claim 8, wherein the standard protocol bus operates in accordance with a SAE J1850 Communications Standard and the plurality of first data elements of the first data packet further contains data of a header field of the bus protocol message.

12. The method in claim 8, wherein the first or second data packet further comprises a control field that includes an identification of a type of standard protocol bus.

13. The method in claim 8, wherein the first or second data packet further comprises a control field that includes an identification of a length of the message data of the bus protocol message.

14. The method in claim 8, wherein the first and second data packets each comprise a header portion, a payload portion, and a trailer portion, the payload portion containing the message identification, the sequence number, and the plurality of data elements.

15. A node in a switch fabric of a vehicle communication network, the switch fabric including a plurality of other nodes joined by communication links for the transmission of data packets therebetween, the node being connected to a standard protocol bus, the node comprising:
    a transceiver for receiving a bus protocol message from the standard protocol bus at a node in the switch fabric, the bus protocol message including at least message data, and the bus protocol message requiring a response to occur during a predetermined time;
    a processor for generating a retry response message on the standard protocol bus to permit the response to occur at a later time and for dividing the message data of the bus protocol message into a first data packet and a second data packet, the first data packet and the second data packet comprising:
    a message identification associated with the bus protocol message and a sequence number;
    a sequence number associated with an order of the divided message data; and
    a plurality of data elements, the plurality of data elements for the first data packet including at least a first portion of the message data, the plurality of the data elements for the second data packet including at least a second portion of the message data.

16. The node in claim 15, wherein the transceiver transmits the first and second data packets to a destination node in the switch fabric, the destination node configured to assemble the first portion of the message data and the second portion of the message data based on the message identification and the sequence number in the first and second data packets.

17. The node in claim 15, wherein the standard protocol bus operates in accordance with at least one of a Controller Area Network (CAN) protocol, a SAE J1850 Communications Standard, a Local Interconnect Network (LIN) protocol, a FLEXRAY Communications System Standard, and a Media Oriented Systems Transport (MOST) Protocol.

18. The node in claim 15, wherein the standard protocol bus operates in accordance with a Controller Area Network (CAN) protocol and the plurality of first data elements of the first data packet further contains data of an arbitration field of the bus protocol message.

19. The node in claim 15, wherein the standard protocol bus operates in accordance with a SAE J1850 Communications Standard and the plurality of first data elements of the first data packet further contains data of a header field of the bus protocol message.

20. The node in claim 15, wherein the first or second data packet further comprises a control field that includes an identification of a type of standard protocol bus.

21. The node in claim 15, wherein the first or second data packet further comprises a control field that includes an identification of a length of the message data of the bus protocol message.

22. The node in claim 15, wherein the first and second data packets each comprise a header portion, a payload portion, and a trailer portion, the payload portion containing the message identifications, the sequence numbers, and the plurality of data elements.

23. A method for sending a bus protocol message through a switch fabric of a vehicle communication network, the switch fabric including a plurality of nodes joined by communication links for the transmission of data packets therebetween, the bus protocol message having at least message data, the method comprising the steps of:
    receiving the bus protocol message from a standard protocol bus at a node in the switch fabric, the bus protocol message requiring a frame response to occur during a predetermined time;
    generating a retry response on the standard protocol bus to permit the frame response to occur at a later time;
    generating a first data packet comprising at least a first portion of the message data in the bus protocol message;
    generating a second data packet comprising at least a second portion of the message data in the bus protocol message;
    transmitting the first data packet and the second data packet to a target node in the switch fabric of the vehicle communication network.

24. The method in claim 23, wherein the standard protocol bus operates in accordance with a SAE J1850 Communications Standard, the frame response being associated with an in-frame response portion of the bus protocol message.

25. The method in claim 24, wherein the retry response is a null or invalid response.

26. The method in claim 23, wherein the standard protocol bus operates in accordance with a SAE J1850 Communications Standard and the plurality of first data elements of the first data packet further contains data of a header field of the bus protocol message, the data of the heater field including an indicator that the frame response is being requested.

27. The method in claim 23, wherein the first or second data packet further comprises a control field that includes an identification of a type of standard protocol bus.

28. The method in claim 23, wherein the first or second data packet further comprises a control field that includes an identification of a length of the message data of the bus protocol message.

* * * * *

UNITED STATES PATENT AND TRADEMARK OFFICE
CERTIFICATE OF CORRECTION

PATENT NO. : 7,599,377 B2  
APPLICATION NO. : 11/015606  
DATED : October 6, 2009  
INVENTOR(S) : Jordan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-eighth Day of September, 2010

David J. Kappos  
*Director of the United States Patent and Trademark Office*